United States Patent Office.

HUGH McDONALD, OF PITTSBURG, PENNSYLVANIA.

Letters Patent No. 101,291, dated March 29, 1870.

IMPROVEMENT IN THE MANUFACTURE OF CAST-STEEL.

The Schedule referred to in these Letters Patent and making part of the same

*To all whom it may concern:*

Be it known that I, HUGH McDONALD, of the city of Pittsburg, in the county of Allegheny and State of Pennsylvania, have invented a new and useful Improvement in the Manufacture of Cast-Steel; and I do hereby declare the following to be a full, clear, and exact description thereof.

In the manufacture of steel from pig-iron in a puddling furnace, to produce the article commonly called puddled steel, the process has heretofore been carried on in the puddling furnace until the metal is balled, when it is removed to the hammer or squeezers, and afterward rolled, the operation differing from that of making wrought iron in so operating the dampers and manipulating the iron in the puddling furnace as to effect the purification of the iron with a less degree of decarbonization, leaving a sufficient amount of carbon in the metal to produce steel, instead of continuing the process until the carbon is almost or altogether removed.

My improvement consists in treating the metal in a puddling or other melting furnace, either with or without stirring with a rabble, until the iron is on the point of coming to nature, and then, before it is in a condition to ball, removing it from the melting furnace, and transferring it to crucibles, in which it is exposed to the ordinary crucible treatment in a steel furnace, which, however, needs not to be continued so long as is usual in the manufacture of cast-steel from wrought iron in crucibles.

To enable others skilled in the art to use my improvement, I will proceed to describe the operation more in detail.

I take pig metal and place it in a puddling furnace, or other suitable furnace adapted to melting metal, and there, having melted it, I allow it to remain exposed to a high heat for a short time, the length of time required varying somewhat, according to the size of the charge; the larger the charge, the longer the time required to effect the desired amount of decarbonization. The degree of heat may also be varied somewhat, as the process may be carried on with a comparatively low temperature.

While thus in a molten condition, the iron may be stirred with a rabble, to hasten the process of decarbonization, as is ordinarily practiced in a puddling or boiling furnace; or it may be allowed to remain quiet, exposed to the surface action of the carbonic oxide from the furnace, until it is in a condition for treatment in the crucible. This point is ascertained by inspection. As soon as the iron begins to form into small lumps or particles, which adhere to the rabble when inserted into the melted mass, it is ready to be removed, care being taken that the iron is not allowed to ball; or the iron may be allowed to remain a little longer, provided it does not reach the condition necessary for balling, squeezing, hammering, &c.

The iron is then immediately removed from the furnace, and is either run at once into crucibles, or is allowed to solidify, and is then broken up by crushing, cutting, or otherwise, and placed in crucibles for further treatment.

The iron thus treated is purified and deprived of a large proportion of its carbon, of which, however, it still retains a sufficient amount to yield steel.

When placed in the crucibles, there may be added to it manganese, or other ingredients such as are usually employed in making steel in crucibles, according to the quality of iron employed, and the kind and grade of steel to be manufactured. The crucibles are then covered over, placed in the ordinary steel furnace, and there treated in the usual way, with the exception, only, that so long a time will not be required to complete the process as is usual with steel made in crucibles in the ordinary way.

The time required for the treatment in the crucibles will vary in different cases, but can always be ascertained by the ordinary indications on examination of the contents of the crucibles by those who are experienced in the manufacture of steel.

When the process is complete, the contents of the crucibles may be poured out into molds, and will be found to be a good quality of cast-steel.

Having thus described my improvement,

What I claim as my invention, and desire to secure by Letters Patent, is—

The within-described process of making cast-steel from pig metal by melting it, and exposing it to the surface action of the gas from the heating furnace, with or without working until the iron is just on the point of coming to nature, and then, while it is yet short of a balling condition, removing it, and placing it, either in a melted condition, or broken into small pieces, into crucibles, and subjecting it therein to the ordinary treatment of a crucible furnace, substantially as and for the purposes hereinbefore set forth.

In testimony whereof, I, the said HUGH McDONALD, have hereunto set my hand.

HUGH McDONALD.

Witnesses:
A. S. NICHOLSON,
F. M. MAGEE.